United States Patent
Sick et al.

(10) Patent No.: US 11,180,894 B2
(45) Date of Patent: Nov. 23, 2021

(54) GEL WITH PU MATRIX AND VEGETABLE OIL

(71) Applicant: Advanced Polymer Technology Corp., Harmony, PA (US)

(72) Inventors: Stephan Sick, Willich-Neersen (DE); Frank Luccarelli, Zelienople, PA (US); Wesley Baum, Emlenton, PA (US); Andreas M. Schulze Ising, Sewickley, PA (US)

(73) Assignee: Advanced Polymer Technology Corp., Harmony, PA (US)

( * ) Notice: Subject to any disclaimer, the term of this patent is extended or adjusted under 35 U.S.C. 154(b) by 0 days.

(21) Appl. No.: 16/474,314

(22) PCT Filed: Dec. 28, 2017

(86) PCT No.: PCT/EP2017/084767
§ 371 (c)(1),
(2) Date: Jun. 27, 2019

(87) PCT Pub. No.: WO2018/122347
PCT Pub. Date: Jul. 5, 2018

(65) Prior Publication Data
US 2019/0345361 A1    Nov. 14, 2019

(30) Foreign Application Priority Data

Dec. 28, 2016 (EP) .................................. 16207153
Mar. 21, 2017 (EP) .................................. 17162012

(51) Int. Cl.
C09D 175/04    (2006.01)
C09D 7/65      (2018.01)
(Continued)

(52) U.S. Cl.
CPC ............ *E01C 13/065* (2013.01); *A43B 13/04* (2013.01); *B32B 9/005* (2013.01); *B32B 27/06* (2013.01);
(Continued)

(58) Field of Classification Search
None
See application file for complete search history.

(56) References Cited

U.S. PATENT DOCUMENTS 3,218,287 A * 11/1965 Schmidle ................ C08L 33/00
                                                         524/310
5,657,410 A    8/1997 Fehn et al.
(Continued)

FOREIGN PATENT DOCUMENTS

WO    WO-03011947 A1    2/2003

OTHER PUBLICATIONS

Transmittal of International Search Report and Written Opinion (PCT/ISA/220) for PCT International Application No. PCT/EP2017/084767 dated Feb. 9, 2018.
International Search Report (PCT/ISA/210) for PCT International Application No. PCT/EP2017/084767 dated Feb. 9, 2018.
Written Opinion (PCT/ISA/237) for PCT International Application No. PCT/EP2017/084767 dated Feb. 9, 2018.
European Office Action dated Feb. 16, 2021 for corresponding European Application No. 17162012.3.
(Continued)

*Primary Examiner* — Tae H Yoon
(74) *Attorney, Agent, or Firm* — Harness, Dickey & Pierce, P.L.C.

(57) ABSTRACT

An elastic gel includes a solid component and a liquid component. The solid component is a polyurethane polymer matrix. The liquid component is a plasticizer. The liquid component includes one or more vegetable oils or chemical derivatives of vegetable oils or a mixture thereof and is comprised in cells of the polyurethane polymer matrix.

11 Claims, 3 Drawing Sheets

(51) Int. Cl.
| | |
|---|---|
| *C08L 75/00* | (2006.01) |
| *C08J 3/075* | (2006.01) |
| *E01C 13/06* | (2006.01) |
| *B60R 13/02* | (2006.01) |
| *B32B 27/06* | (2006.01) |
| *B32B 9/00* | (2006.01) |
| *A43B 13/04* | (2006.01) |
| *C08G 18/10* | (2006.01) |
| *C08G 18/48* | (2006.01) |
| *C08G 18/76* | (2006.01) |
| *C08J 7/04* | (2020.01) |
| *C08K 5/09* | (2006.01) |
| *E04F 15/12* | (2006.01) |
| *E04F 15/22* | (2006.01) |

(52) U.S. Cl.
CPC .............. *B60R 13/02* (2013.01); *C08G 18/10* (2013.01); *C08G 18/4854* (2013.01); *C08G 18/7671* (2013.01); *C08J 3/075* (2013.01); *C08J 7/042* (2013.01); *C08K 5/09* (2013.01); *C08L 75/00* (2013.01); *C09D 7/65* (2018.01); *C09D 175/04* (2013.01); *E04F 15/12* (2013.01); *E04F 15/225* (2013.01); *C08J 2375/04* (2013.01); *C08J 2423/16* (2013.01); *C08J 2433/08* (2013.01); *C08L 2205/06* (2013.01); *C08L 2207/324* (2013.01)

(56) References Cited

U.S. PATENT DOCUMENTS

| | | | | |
|---|---|---|---|---|
| 6,359,157 | B2* | 3/2002 | Peter | C11C 3/003 |
| | | | | 554/169 |
| 6,433,121 | B1* | 8/2002 | Petrovic | C07D 303/42 |
| | | | | 527/600 |
| 7,589,222 | B2* | 9/2009 | Narayan | C08G 18/36 |
| | | | | 554/133 |
| 8,217,193 | B2* | 7/2012 | Narayan | C11C 3/006 |
| | | | | 554/133 |
| 8,535,572 | B2* | 9/2013 | Tsonev | C08G 18/831 |
| | | | | 252/511 |
| 8,845,443 | B1 | 9/2014 | Weaver | |
| 2005/0137030 | A1 | 6/2005 | Sullivan | |
| 2011/0140053 | A1* | 6/2011 | Tsonev | C08L 75/04 |
| | | | | 252/511 |
| 2013/0011621 | A1 | 1/2013 | Russell et al. | |
| 2013/0296449 | A1 | 11/2013 | Peterson et al. | |

OTHER PUBLICATIONS

Wagner, Lisa, "Überblick über die in der DDR hergestellten und verwendeten synthetischen Produkte zur Konservierung von bemalten oder gefassten Holzobjekten, Seminararbeit, Hochschule für Bildende Künste Dresden," May 28, 1999, pp. 1 and 458-461.

* cited by examiner

GEL WITH PU MATRIX AND VEGETABLE OIL

CROSS-REFERENCE TO RELATED APPLICATIONS

This application is a national phase under 35 U.S.C. § 371 of PCT International Application No. PCT/EP2017/084767 which has an international filing date of Dec. 28, 2017, which claims priority to European Application No. 17162012.3, filed Mar. 21, 2017, also claims priority to European Application No. 16207153.4, filed Dec. 28, 2016 the entire contents of each of which are hereby incorporated by reference.

FIELD OF THE INVENTION

This invention relates to elastic materials, and, more specifically, to a gel.

BACKGROUND AND RELATED ART

There exist numerous types of gels, including silicone gels, acrylic gels, block copolymer elastomer gels, and others. Certain types of gels are preferred because they are less tacky, have greater tensile, compression, shear and tear strengths, and do not exhibit permanent deformation after being stressed heavily in some cushioning situations.

One problem with the use of the known gels is that they often have a "tacky" surface as liquid ingredients of the gel may leak out.

Another, related problem is known as the "fogging effect". The fogging effect is caused by liquid or volatile components of the gel having managed to leave the gel. Fogging refers to the outgassing of materials, in particular new materials, which precipitate in the environment. In a car, the fogging effect of many state-of-the art cushioning elements comprising plasticizers results in a greasy covering on the windshield.

Furthermore, some plasticizers, e.g. phthalates, are suspected of being carcinogenic. Thus, the loss of the plasticizer may have many negative effects on the elastic material as well as on the environment. When a significant portion of a plasticizer has evaded a gel, the gel may become brittle, less elastic and may finally break down.

U.S. Pat. No. 5,657,410 describes an optical transmission element which includes a filler comprising between 80% and 95% by weight of a monomeric plasticizer including esters of phthalates, trimellitates, phosphates and fatty esters. Additional substances may also be added such as thickeners. The thickener can take the form of small spheres. Hollow spheres are preferred due to their great compressibility and easy processibility.

US patent application US 20130011621 A1 (Russell David Dale et al., 2013 Jan. 10) describes a low tack viscoelastomeric gel material formed by combining about 50% to about 80% of a polyol; about 3% to about 15% of an isocyanate; about 15% to about 40% of an oil; about 0.1% to about 1% of a catalyst; and about 0% to about 1% of a release agent. Support structures comprising a layer of low tack viscoelastomeric gel material are also described. Further aspects also include methods of making the low tack viscoelastomeric gel material and methods of making support structures with a layer of low tack viscoelastomeric gel material.

US patent application US 2013/296449 A 1 (Peterson Bruce W et al., 2013 Nov. 7) describes combinations of open cell flexible foams with polyurethane gel-like polymers, in forms such as layers of different forms and shapes, solid sheets, perforated sheets, and particles, and methods of making the combinations. The resin to make the polyurethane gel-like polymers may be infused into the polyurethane foams.

SUMMARY

It is an objective of the present invention to provide an improved elastic gel and a method for creating the same as specified in the independent claims. Embodiments of the invention are given in the dependent claims. Embodiments of the present invention can be freely combined with each other if they are not mutually exclusive.

In one aspect, the invention relates to an elastic gel comprising:
  a solid component; the solid component is polyurethane polymer matrix;
  a liquid component; the liquid component is a plasticizer; the liquid component comprises one or more vegetable oils or chemical derivatives of vegetable oils or a mixture thereof; the liquid component is comprised in cells of the polyurethane polymer matrix.

Using vegetable oil(s) as the plasticizer may have the advantage that the plasticizer is inexpensive, lowers the carbon footprint of the product, is biodegradable and in some cases even compostable and non-toxic. In particular, vegetable oil which are free of potentially toxic substances such as polycyclic aromatic hydrocarbons (PAHs) are used as the plasticizer. Using vegetable oils may have the advantage of using a bio-degradable, non-toxic material.

In a further beneficial aspect, the fogging effect may be avoided by using vegetable oils. Thus, the gel does neither emit toxic substances nor does it cause the creation of an unsightly looking patina on containers, vehicles or rooms comprising the gel element. Fogging refers to the outgassing of materials, in particular new materials, which precipitate in the environment. In a car, the fogging effect of many state-of-the art plasticizers results in a greasy covering on the windshield. The condensable components of the material that causes the fogging can be measured by a gravimetric or reflectometric fogging test. For this purpose, a sample of the material is heated. The volatile constituents escape from the material and are deposited in the (colder) environment. In the gravimetric fogging test, the increase in weight by condensation is measured. The determined value is given in mg and is typically in the range less than 5 and 2 mg, respectively. Reflectometric fogging tests exist as well. For example, the FILK institute (Forschungsinstitut für Leder- and Kunststoffbahnen) uses standardized tests, e.g. VDA 277 (PV 3341, VCS 1027, 2759) or TSM0508G for measuring and quantifying the emissions of various materials.

Embodiments of the invention may have the advantage that a high shock absorption rate of 20% and more can be achieved. Thus, a very good balance of physical properties needed for the performance of a shock absorbing element can be achieved. High shock absorption rates are beneficial in the context of many types of cushioning elements, e.g. in shoe laces and shoes, vehicle parts and floorings, in particular sports grounds like tennis courts and running tracks.

It has been observed that the shock absorption rate of a PU polymer matrix soaked with one or more vegetable oils is higher than of a PU foam layer of similar height whose cells are filled with air. Likewise, in order to achieve a desired shock absorption rate, the height and/or width of the gel may be reduced as the same cushioning effect may be achievable with a lower volume of the shock absorbing material. This may reduce material costs and may be of particular value for applications where spatial constraints may impose a limit to the permissible volume of a shock absorbing gel element.

According to embodiments, the plasticizer consists of the one or more vegetable oils or chemical derivatives thereof. Optionally, the plasticizer may comprise some additives, e.g. fungicides, while more than 90%, preferentially more than 95% of the plasticizer consist of the one or more vegetable oils or derivatives thereof.

According to embodiments, the vegetable oil consists of or comprises one or more triglycerides or comprises the one or more triglycerides as its major component (>50% by weight of the vegetable oil. The triglyceride can be a mixture of multiple different triglycerides.

The triglycerides can comprise, for example, stearin derived from stearic acid, palmitin derived from palm itic acid, linseed oil (rich in di- and tri-unsaturated fatty acid components) and others.

According to embodiments, the triglyceride is selected from a group comprising tristearate, tripalmitate, trioleate, trilinoleate, triricinoleate or a mixture of two or more of the foregoing.

A triglyceride (TG, triacylglycerol, TAG, or triacylglyceride) is an ester derived from glycerol and three fatty acids (tri-+glyceride). In triglycerides, the hydroxyl groups of the glycerol join the carboxyl groups of the fatty acid to form ester bonds.

Preferentially, the triglycerides are unsaturated triglycerides, e.g. unsaturated or polyunsaturated triglycerides derived e.g. from linoleic acid. Saturated fats are "saturated" with hydrogen—all available places where hydrogen atoms could be bonded to carbon atoms are occupied. Unsaturated fats have double bonds between some of the carbon atoms, reducing the number of places where hydrogen atoms can bond to carbon atoms. Using unsaturated triglycerides may be advantageous as these triglycerides have a lower melting point and are more likely to be liquid at low temperatures.

According to embodiments, the liquid component is free of n-pentane. This may be advantageous as both smell emissions and environment damages through the emission of pentane may be avoided.

For example, the vegetable oil derivative is a polyester (generated e.g. in a transesterification of vegetable oils) and the molecules of the polyester respectively comprise at least three fatty acids.

According to embodiments, the molecules of the polyester respectively comprising a carbon atom backbone and at least three fatty acids respectively bound to the carbon atom backbone by an ester bond, the carbon atom backbone comprising at least four carbon atoms.

According to embodiments, at least 50%, or at least 70% of the liquid component (the plasticizer) consists of the one or more vegetable oils or the derivatives or a mixture thereof. Preferably, at least 90%, preferably at least 95% up to 100% of the liquid component consists of the one or more vegetable oils or the derivatives or a mixture thereof. For example, the liquid component can comprise some few % of liquid fungicides or other additives, the rest consists of the plasticizer being one or more vegetable oils or a derivative thereof.

According to embodiments, the plasticizer is a triglyceride or at least the one or more vegetable oils are triglycerides.

According to embodiments, at least 1% by weight of the plasticizer, more preferentially at least 20% by weight of the plasticizer, is covalently bound to the polyurethane polymer matrix. The covalent bonds are the result of a reaction of a functional group of a fatty acid side chain with a isocyanate that is part of the PU reaction mixture used for generating the PU polymer matrix. This may be advantageous as no additional process step is necessary for firmly fixing the plasticizer to the PU matrix. According to preferred embodiments, more than 90% by weight of the plasticizer or even 100% by weight of the plasticizer is covalently bound to the PU polymer matrix. The liquid component consists of the plasticizer and optionally of a few percentage of additives. Thus, more than 90% by weight of the liquid component or even 100% by weight of the liquid component can be covalently bound to the PU polymer matrix. Thus, the liquid component is prohibited from leaving the gel.

According to embodiments, the fraction of the plasticizer that is covalently bound to the polyurethane polymer matrix is a vegetable oil that comprises one or more functional groups in at least one of its fatty acid chains. The chemical bound is based on a reaction of functional groups of fatty acid chains of the vegetable oils with an isocyanate in a polyurethane reaction mixture that was used to form the polyurethane polymer matrix. The covalent bonds connect the fatty acid chains with the polymer matrix. The other fractions of the plasticizer may consist of vegetable oils lacking a functional group or of additives.

According to embodiments, a method for preparing the gel comprises preparing a polyurethane reaction mixture comprising isocyanates and polyols and the vegetable oil. The vegetable oil comprises functional groups, e.g. —OH or NH2 groups. The functional groups of the fatty acid chains of at least some vegetable oil molecules react with the isocyanates of the reaction mixture, thereby covalently binding the vegetable oil or parts thereof to the polyurethane matrix.

This may be beneficial as at least some or even almost all the vegetable oil molecules are covalently bound to the PU polymer matrix, thereby preventing the oil from leaving the gel.

According to preferred embodiments, the plasticizer consists of one or more vegetable oils or chemical derivatives thereof.

According to preferred embodiments, more than 60%, preferentially more than 90% of the plasticizer molecules added to the PU reaction mixture that forms the gel comprises at least one functional group that is able to react with isocyanate. Accordingly, more than 60%, preferentially more than 90% of the plasticizer molecules are covalently bound to the PU polymer matrix in the gel.

The three fatty acids are usually different, and many kinds of triglycerides can be used as plasticizer. The chain lengths of the fatty acids in naturally occurring triglycerides vary, but most contain 16, 18, or 20 carbon atoms. Thus, according to embodiments, the vegetable oil comprises or consists of triglycerides having 16-20 carbon atoms in each of their fatty acid chains.

According to embodiments, the vegetable oil contains a complex mixture of different triglycerides, in particular a mixture of saturated and unsaturated triglycerides. For example, 50% of the vegetable oil may consist of unsaturated vegetable oil(s) and 50% of the vegetable oil may consist of saturated vegetable oil(s). This may be advantageous as vegetable oils comprising a mixture of different triglycerides melt over a broad range of temperatures. This may provide for a pavement structure whose elasticity is comparatively constant over a wide temperature range.

According to embodiments, more than 50% by weight of the vegetable oil consists of unsaturated triglycerides. In a preferred embodiment, vegetable oils whose majority of their fatty acid chains are unsaturated are used as the plasticizer. A fatty acid comprising at least one unsaturated carbon bond is considered an "unsaturated" fatty acid and a triglyceride comprising at least one unsaturated fatty acid is referred herein as "unsaturated triglyceride" or "unsaturated vegetable oil".

For example, cottonseed oil having typically 52% polyunsaturated fatty acids and 18% monounsaturated fatty acids can be used as the plasticizer.

According to another example, soy bean oil is used as the vegetable oil. Soy bean oil comprises about 84% unsaturated, functionalized oils and about 16% saturated, nonfunctionalized oils. Accordingly, at least 16% of a soy bean oil based plasticizer will not react with isocyanate and will not be immobilized. Using soy bean oil may be particularly advantageous as it already comprises functional groups that allow to bind the oil covalently to the PU polymer backing without performing an additional step for adding functional groups to the fatty acid chains.

In other embodiments, vegetable oils like soy bean oil, linseed oil or castor oil are chemically converted to achieve a higher degree of unsaturation. The unsaturated conversion products are optionally functionalized, i.e., one or more hydroxyl or amino groups are added to the fatty acid chains of the oil. The converted and optionally functionalized vegetable oils are then used as the plasticizer. According to embodiments, about 55% to 65%, e.g., about 60% by weight of the gel consists of the plasticizer; the rest consists of the PU polymer matrix and optional further substances, e.g. additives.

According to embodiments, the gel has a height of 1 mm to 800 mm. For example, the gel has a height of 1 mm to 40 mm and may be used as a gel layer in an elastic floor pavement structure.

In a further aspect, the invention relates to a layered structure comprising:
  a top layer that seals the layered structure; and
  a gel layer consisting of the gel according to any one of the embodiments and examples described herein, the gel layer being located between a base material and the top layer.

According to embodiments, the layered structure is a layered floor pavement structure and further comprises a barrier layer between the gel layer and the top layer. The barrier layer is adapted to prevent the plasticizer from leaving the gel layer in the direction from the base layer to the top layer.

Using a barrier layer may be advantageous as the life expectancy of the pavement structure may be increased. The barrier layer may prevent the plasticizer molecules not covalently bound to the matrix from leaving the gel layer and thus prevent the gel layer from becoming brittle and less elastic. Thus, the shock absorbing properties of the gel layer may be maintained over many years also under extreme conditions like extreme low temperatures in winter and direct sunlight and high temperatures in summer.

Some of the plasticizer molecules which are not covalently bound to the matrix may migrate to the gel surface and may leave the gel and/or may be affected by abrasion of the pavement structure. Using a barrier layer may have the further advantage of preventing the newly installed pavement structure from smelling of vegetable oil in case only a small fraction of the vegetable oil is covalently bound to the matrix.

According to embodiments, the barrier layer is a layer of synthetic resin. The barrier layer comprises an amount of more than 40% of a water based acrylic at the moment of applying the layer onto the gel layer. When the water has evaporated from the barrier layer, the acrylic fraction of the barrier layer may exceed 80% by weight of the barrier layer.

"Synthetic resins" as used herein are viscous liquids that are capable of hardening permanently. Some are manufactured by esterification or soaping of organic compounds. Some are thermosetting plastics in which the term "resin" is loosely applied to the reactant or product, or both. For example, liquid methyl methacrylate is often used as a synthetic resin while it is in the liquid state, before it polymerizes and "sets". After setting, the resulting PMMA is the "hardened resin", often renamed acrylic glass, or "acrylic" layer. According to some embodiments, the synthetic resin is epoxy resin, PU resin or polyester resin.

According to embodiments, the barrier layer comprises a compatibilizer adapted to promote adhesion of the top layer to the gel layer.

According to embodiments, the barrier layer comprises ethylene glycol as the compatibilizer adapted to promote adhesion of the top layer to the gel layer.

According to embodiments, the top layer is an acrylic emulsion comprising pigments and sand.

For example, the top layer can be an acrylic latex layer, a styrolbutadien layer or a layer that is based on a combination of acrylic latex and carboxylated styrolbutadien. The top layer can comprise a significant portion (e.g. more than 40% or even more than 60% of its weight) filling materials such as sand and/or chalk which improve the surface roughness and the grip, but which may deteriorate the adhesion to the PU based gel layer. The compatibilizer can be, for example, ethylene glycol which promotes adhesion between acrylate and PU. The ethylene glycol is comprised in the barrier layer in an amount of at least 0.5%, preferentially about 1% by weight of the barrier layer.

According to embodiments, more than 40% by weight of the barrier and the top layer consists of acrylic latex, styrolbutadien or a combination of acrylic latex and carboxylated styrolbutadien.

Using a barrier layer that comprises a compatibilizer may be advantageous as the compatibilizer may prevent a delaminization of the gel layer and the top layer. For example, the top layer can be hydrophilic and the gel layer is typically hydrophobic. By using a compatibilizer that is capable of strongly adhering both to hydrophobic and to hydrophilic substances, a delamination of the gel layer and the top layer may be prevented. Thus, the life expectancy of the pavement layer structure may be increased.

The floor pavement structure can be, for example, a surfacing system for tennis courts, basketball courts, playgrounds, handball courts, soccer fields, and more. In some embodiments, the floor pavement structure is used as an outdoor pavement structures while in other embodiments it is used as an indoor pavement structure. According to some embodiments, the pavement structure is used as a pavement structure of parks, schools, and private homes.

In an advantageous effect, the PU gel may have excellent self-levelling properties: due to the comparably high mass (in comparison to air-filled PU foams), the reaction mixture for the PU-oil gel can penetrate fine cracks in the base material, fill these cracks and thereby smooth and level out any unevenness in the ground. It has been shown that air-filled PU foams often are too light to penetrate small cracks and to smooth uneven patches of the ground. In embodiments where the gel layer is not applied directly on the base material but rather on a primer layer, the improved fluidity and self-levelling properties may still be relevant as the primer layer may be thin and not be able to level out larger cracks and uneven patches. The primer layer is adapted to promote adhesion of the gel layer to the base material.

According to a preferred embodiment, the primer layer is a polyurethane layer that is basically free of the plasticizer and a compatibilizer (as the gel layer comprises a PU matrix, a compatibilizer is not necessary). Preferentially, the A and B components of the primer layer PU are chosen such that the PU is a non-foamed PU that can be sprayed or painted on the ground. The primer layer may improve the adhesion of the PU based gel layer to the ground.

Using a primer layer may have the advantage that the primer will seal and fill in cracks of the base material.

According to embodiments, the top layer is an acrylic emulsion comprising pigments and sand.

This may be advantageous as the sand gives the surface of the material the rough feel and touch of a sandy court, e.g. a tennis court, whereby the sand grains are firmly fixed in the hardened acrylic emulsion of the top layer. According to embodiments, multiple layers of the top layer may be applied. This may increase the amount of sand added to the pavement structure and may increase the surface roughness, grip and robustness of the pavement structure.

According to embodiments, the pavement structure comprises only one or more coatings of the primer layer, the gel layer, the barrier layer and one or more coatings of the top layer. In addition or alternatively, the pavement structure is basically free of any air-filled foams or air-filled layers comprising elastic granules (e.g. rubber granules). This may be advantageous as it has been observed that pavement structures comprising an air-filled layer with elastic granules may be more susceptible to wear and tear by mechanical stress than pavement structures comprising only a gel layer as elastic element. As a given volume of air (e.g. in a PU polymer bubble or in the inter-granule space of a rubber granule layer) is compressed much stronger by a given pressure than a liquid, e.g. oil, the mechanical deformation of the PU foam and of any layer contacting the air-filled PU foam layer may be much higher in case the elastic layer comprises air rather than oil. This may result in an increased wear and tear of pavement structures comprising an air-filled elastic layer rather than oil-filled elastic layer.

According to embodiments, the layered structure further comprises a primer layer between the base material and the gel layer. The primer layer is adapted to promote adhesion of the gel layer to the base material.

According to embodiments, the base material is concrete, asphalt, sand, stone, wood, or clay or a mixture of two or more of the foregoing.

According to embodiments, the floor pavement structure has the following properties:
the top layer has a height of 100 µm-2 mm, preferably 200 µm-1000 µm, preferably 400 µm-500 µm; and/or
the barrier layer has a height of 5 µm-300 µm, preferably 20 µm-200 µm, preferably 50 µm-100 µm; this may be advantageous as this layer thickness may successfully prevent the oil in the gel from evaporating and leaving the surface structure in direction of the top layer; and/or
the gel layer has a height of 1 mm-4 mm, preferably 1.5-3.5 mm, preferably about 2 mm; this may be advantageous as this layer thickness may be sufficient to provide a shock absorption effect required for many types of sports grounds, e.g. a tennis court; and/or
the primer layer has a height of 5 µm-500 µm, 50 µm-300 µm, preferably 100 µm-150 µm.

According to embodiments, the top layer is a polyurethane layer. The polyurethane layer comprises EPDM granules. The pavement structure of these embodiments may lack a barrier layer.

The PU layer may adhere very well to the PU matrix of the gel layer without an additional barrier layer that also acts as a compatibilizer and prevents delamination of the top layer. Thus, the top layer directly contacts the gel layer. Preferentially, according to this embodiment, the PU of the top layer is a non-foamed, latex-like layer that acts as a barrier that prevents the plasticizer from leaving the gel layer in direction of the top layer. For example, the EPDM granules can have a diameter in the range of 0.5 mm to 4 mm, preferentially in the range of 0.5 mm to 2.5 mm.

According to embodiments, the floor pavement structure further comprises a polyurethane layer between the gel layer and the top layer or between the gel layer and the barrier layer, if any.

According to embodiments, the pavement structure is a sports floor mat (also referred to as sports mat). According to other embodiments, the pavement structure is a running track or a part thereof.

In a further aspect, the invention relates to a shoe sole comprising the gel according to any one of the embodiments and examples described herein in the form of a gel layer. For example, the gel may be contained only in parts of the shoe sole, e.g. in the area under the heel, or may form a continuous layer within the shoe sole that basically covers the whole area under a food.

In a further aspect, the invention relates to a vehicle interior panelling comprising the gel according to any one of the embodiments and examples described herein.

According to embodiments, the vehicle interior paneling is a vehicle interior paneling configured to be mounted in the head impact area within a car and the steering wheel cover and parts of a car's ventilation system with which a car occupant might collide in case of a car accident. For example, elastic radiator panels, steering wheel coverings may comprise the gel. Thereby, the gel may have various forms and dimensions depending on the specific paneling that comprises the gel.

In a further aspect, the invention relates to a method of generating a gel. The method comprises:
generating a polyurethane reaction mixture comprising a isocyanate component, a polyol component, and a liquid plasticizer, the plasticizer comprising one or more vegetable oils or chemical derivatives of vegetable oils or a mixture thereof;
reacting at least the isocyanate component and the polyol component with each other to form a solid component of the gel, the solid component being polyurethane polymer matrix, the liquid plasticizer being comprised in cells of the polyurethane polymer matrix.

According to embodiments, the method further comprises applying the polyurethane reaction mixture before the polyol component and the isocyanate component have completed reacting with each other on a base material or a carrier material. The carrier material may form a mould and the mould may be used to ensure that the reaction mixture solidifies into the gel whose shape fills the mould. The shape of the mould is chosen such that the resulting gel fits into the desired end product, e.g. a part of a vehicle, a shoe, a handle of a tool or the like.

In some embodiments, the vegetable oil is extracted from plant material essentially without introducing chemical modifications. This may have the advantage that the production of the gel is particularly quick and inexpensive.

Suitable vegetable oils having e.g. a desired amount of unsaturated fatty acids have been mentioned above.

In other embodiments, the vegetable oil is chemically modified, e.g. for increasing the number of unsaturated carbon bonds and/or for adding one or more hydroxyl or amino groups and/or for replacing the glycerol component by another alcohol (in a transesterification reaction, preferentially for replacing the glycerol by an alcohol comprising more than three carbon atoms in its "backbone"). Thus, in the transesterification reaction, the carbon backbone, e.g. glycerol, of the vegetable oil (e.g. castor oil or soy bean oil) is replaced by a Polyoxymethylene (POM) resin (also known as acetal, polyacetal and polyformaldehyd). For example, the POM resin can be methylcyclohexanonformaldehyd resin. For example, POM can be obtained commercially as "L2 resin" of POLYKON. Several other polyacetals that can be used for replacing the "original" short carbon backbone (corresponding to the alcohol educt the vegetable oil is based on) by a new carbon backbone with more than three carbon atoms are described in Wagner (1999)—Wagner, Lisa (1999): "Überblick über die in der DDR hergestellten and verwendeten synthetischen Produkte zur Konservierung von bemalten oder gefassten Holzobjekten, Seminararbeit, Hochschule für Bildende Künste Dresden".

According to some embodiments, the transesterification reaction can be performed in the form of a thermal transesterification or an enzymatic transesterification. Using enzyme-based transesterification may have the advantage that the transesterification reaction is highly specific and a defined type of ester will be obtained from defined educts. According to other embodiments, thermal transesterification is used for replacing the carbon backbone of vegetable oils (typically glycerol) by a larger carbon atom backbone, e.g. POM. Thermal transesterification often generates a heterogeneous mixture of products, but has the advantage of being more robust against proteases, heat and other factors which may have a negative impact on enzymatic activity.

The new carbon backbone comprising more than three carbon atoms is able to bind to a greater number of fatty acid chains than glycerol. This does not only increase the size and weight of the generated molecule, it also reduces its mobility and the likelihood that at least one of its fatty acid chains was able to react with an isocyanate and thus be covalently linked to the PU polymer matrix.

According to some embodiments, all or almost all of the plasticizer is covalently bound to the PU polymer matrix, thereby preventing any leaking of the plasticizer to the outside of the gel. Thus, according to embodiments, there is no fogg effect, no loss of elasticity, no environmental harm and no smell emissions.

According to embodiments, the method further comprises generating the plasticizer as a chemical derivative of one or more vegetable oils. The generation comprises performing a transesterification reaction for transforming one or more vegetable oils into a polyester. The polyester comprises at least three fatty acids, more preferentially at least four fatty acids. The transformation can comprise transforming two or more different vegetable oil molecules into a single new polyester molecule by transferring all fatty acid chains of the two or more vegetable oil molecule on a single receiver molecule, e.g. an alcohol or polymethylene (POM) resin molecule. This may have the advantage that a very high-molecular plasticizer is generated that is highly flexible and may ensure that the generated gel is elastic. At the same time, a single functionalized group in one out of many fatty acid chains that have been transferred to the POM resin molecule or alcohol molecule may be sufficient for covalently binding the high-molecular plasticizer to the PU polymer matrix, thereby preventing the plasticizer from leaving the gel.

According to embodiments, the plasticizer is a vegetable oil or a mixture of vegetable oils extracted from lin seed, from soy beans, from the seed from the nut of the tung tree (*Vernicia fordii*) and/or from the castor oil plant (*Ricinus communis*). Tung oil (or China wood oil) is a drying oil obtained by pressing the seed from the nut of the tung tree (*Vernicia fordii*). Tung oil hardens upon exposure to air, and the resulting coating is transparent and deep almost wet-look. The major fatty acids in tung oil are alpha-eleostearic acid (82.0%), linoleic acid (8.5%), palmitic acid (5.5%) and oleic acid (4.0%).

In a preferred embodiment, at least one vegetable oil used as the plasticizer comprises at least one functional group in at least one of its fatty acid chains, whereby the functional group is able to react with isocyanate to covalently bind the vegetable oil molecule to the PU-polymer matrix of the gel layer. An example for such a plasticizer comprising one functional OH group in each of its three fatty acid chains is castor oil. Castor oil is a triglyceride ester of three mono-unsaturated 18 carbon fatty acid molecules, the ricinoleic acid molecules. This fatty acid has at the C-12 atom a hydroxyl function, which makes the reaction with an isocyanate possible. The plasticizer is added to the PU reaction mixture comprising the A-component and B-component before the PU polymerization has started or at least before the PU polymerization has completed.

Thus, at this stage, there exist many free isocyanate molecules which can react with the functional group, thereby generating a complex network of plasticizer molecules covalently bond via one or more of their functionalized groups to one or more PU polymer molecules.

Using a functionalized vegetable oil may be beneficial, as the PU polymerization reaction will create a highly complex network of covalent bonds between plasticizer molecules and PU polymers. Thus, a significant fraction of the plasticizer is immobilized and does not migrate out of the gel layer or in other portions within the gel layer in response to mechanical stress. Nevertheless, the plasticizer is still in liquid state and comprises sufficient elasticity and motility to provide for a gel layer that is highly elastic.

According to embodiments, the vegetable oil used as the plasticizer comprises a mixture of functionalized and non-functionalized oils. In some plant species, the majority of unsaturated fatty acids forming part of the plant's vegetable oil(s) comprises one or more functional groups and the majority of completely saturated fatty acids forming part of a plant oil is free of a functional group that can react with the isocyanate component. Thus, at least the portion of the vegetable oils that exclusively comprise nonfunctionalized fatty acids are not covalently bound to the PU matrix and can move freely within the volume of the one or more PU matrix cells in which they reside.

According to embodiments, the molecules of the polyester respectively comprise a carbon atom backbone and at least three fatty acids respectively bound to the carbon atom backbone by an ester bond. The carbon atom backbone comprises at least four carbon atoms.

According to embodiments, the one or more vegetable oils comprise one or more functional groups in at least one of its fatty acid chains. The generation of the plasticizer comprises reacting the functional group with the isocyanate component in the polyurethane reaction mixture, thereby forming covalent bonds between the fatty acid chains and the polyurethane polymer matrix.

According to one embodiment, the plasticizer is generated by chemically increasing the number of unsaturated carbon bonds in the fatty acids of the vegetable oils. This may have the benefit of a reduced melting temperature and liquid state of the plasticizer over a wide temperature range. In addition, or alternatively, the fatty acids in the vegetable oils are chemically functionalized by adding at least one hydroxyl group and/or at least one amino group to at least one of the fatty acid chains of the vegetable oil. This may have the benefit that a significant portion of the plasticizer can be immobilized as it reacts with the isocyanate monomers in the PU reaction mixture that is used for generating the PU polymer matrix of the gel layer.

According to embodiments, the plasticizer is a chemical derivative of a vegetable oil. The method further comprises generating the plasticizer. The generation comprises reacting a plurality of triglyceride molecules in a transesterification reaction into polyester molecules, the polyester molecules respectively comprising at least three fatty acids. In the transesterification reaction the glycerol of the triglyceride molecules is replaced another alcohol backbone having a carbon atom chain that is longer than the carbon atom backbone chain of glycerol. The polyester molecules generated in the transesterification reaction are used as the plasticizer or as a component of the plasticizer. For example, octantriol is an alcohol comprising three hydroxyl-groups whose carbon atom backbone (4 carbon atoms) is longer than that of glycerol (3 carbon atoms).

Replacing the glycerol by another alcohol having a longer carbon atom backbone (or "main chain" and being able to bind four or more fatty acids (via ester bonds) may be advantageous as a large, complex oil molecule is generated that may comprise multiple fatty acid side chains which can bind (via one or more functionalized groups) to the PU matrix. Thus, a highly complex PU-plasticizer polymer structure is generated that immobilizes at least parts of the plasticizer and increases the elasticity of the gel layer. Even in case the number of bound fatty acids per oil molecule remains constant, a prolonged "alcohol backbone" may increase the flexibility of the fatty acids and thus ease the creation of covalent bonds between the functionalized fatty acids and the PU matrix.

According to embodiments, the gel is a gel layer of a pavement structure. In a further aspect, the invention relates to a method of constructing a floor pavement structure. The method comprises:
  applying the PU reaction mixture comprising the plasticizer on top of a base material;
  letting the applied reaction mixture form the PU gel layer comprising a solid component and a liquid component, the solid component being polyurethane polymer matrix, the liquid component being the plasticizer; and
  after the formation of the PU gel layer, applying a top layer that seals the floor pavement structure on top of the PU gel layer.

The expression "applying a layer on top of another layer" as used herein does not imply that the applied layer is necessarily directly applied on the other layer. The applied layer can be applied directly on said other layer but can also be applied on a further layer, e.g. the barrier layer, that is on top of the other layer.

According to embodiments, the method further comprises:
  applying a primer layer on the base material;
  optionally, before the primer has dried, applying silica sand or other forms of granules having the size of silica sand on the primer layer for increasing the surface roughness of the primer layer;
  after the primer layer has dried, performing the application of the PU reaction mixture on top of the primer layer.

According to embodiments, the method further comprises applying a barrier layer on top of the gel layer after the applied reaction mixture has finished forming the PU gel layer. In addition, the method comprises applying the top layer on top of the barrier layer after the barrier layer has solidified.

A "polyurethane gel" or "PU gel" as used herein is an elastic, jelly-like polyurethane material that comprises a liquid. It can be a dilute cross-linked system, which exhibits basically no flow when in the steady-state. By weight, a gel is mostly liquid, yet behaves like a solid due to a three-dimensional cross-linked network of PU polymer cells within the liquid. It is the cross-linking within the fluid that gives a gel its structure (hardness) and contributes to the adhesive stick (tack). Thus, a gel is a dispersion of molecules of a liquid, within a solid network of PU cells in which the solid is the continuous phase and the liquid is the discontinuous phase. The liquid used for providing the gel-like properties of the PU gel layer "softenes" the gel, i.e., makes the gel elastic. The liquid is also referred to as "plasticizer". The gel can consist of a solid three-dimensional network that spans the volume of the whole gel layer and ensnares it through surface tension effects. This internal network structure may result from chemical bonds, i.e., may be caused by the polymerization reaction that creates the PU in an on-site PU polymerization process. According to embodiments, vegetable oils are used as "plasticizers". The resulting gel is thus an oil-based gel. Both by weight and volume, the gel thus may exhibit densities similar to those of the vegetable oil used for its creation.

Polyurethanes are produced by mixing two or more liquid components, a polyol component (also referred to as 'B component') and the isocyanate component (also referred herein as 'A component'). According to embodiments, the polyol component contains catalysts, surfactants, blowing agents and so on. This mixture might also be called a 'resin' or 'resin blend' or 'reaction mixture'. The reaction mixture may further comprise chain extenders, cross linkers, surfactants, flame retardants, blowing agents, pigments, and fillers.

A "plasticizer" as used herein is a substance that increases the plasticity or viscosity of a material. Plasticizers for plastics are additives, most commonly phthalate esters in PVC applications giving this material improved flexibility and durability. The wide variety of ester plasticizer that are in production include sebacates, adipates, terephthalates, dibenzoates, gluterates, phthalates, azelates, and other specialty blends. Nevertheless, embodiments of the invention use vegetable oils as plasticizers. A "vegetable oil" as used herein is a natural, plant-based oil.

BRIEF DESCRIPTION OF THE DRAWINGS

In the following, embodiments of the invention are explained in greater detail, by way of example only, making reference to the following drawings:

FIG. 1 is a flow chart of a method for generating a gel 206. In a first step 100, a polyurethane reaction mixture is generated. The mixture comprises an isocyanate component, a polyol component, and a liquid plasticizer 214. The plasticizer comprises or consists of one or more vegetable oils or chemical derivatives of vegetable oils or a mixture of any one of the aforementioned. In a second step 101, at least the isocyanate component and the polyol component react with each other to form a solid component of the gel. Optionally, also functional groups of one or more fatty acid chains of the vegetable oils react with the isocyanate component to form the solid component 212. The solid component is a polyurethane polymer matrix. The liquid plasticizer is comprised in cells of the polyurethane polymer matrix. Depending on the reaction conditions, the majority of the cells may be closed or may be connected with one or more neighboring cells via openings that allow the plasticizer molecules that are not covalently bound to the matrix to migrate from one cell to the next, e.g. in response to mechanical stress exerted on the gel.

Figure 1:
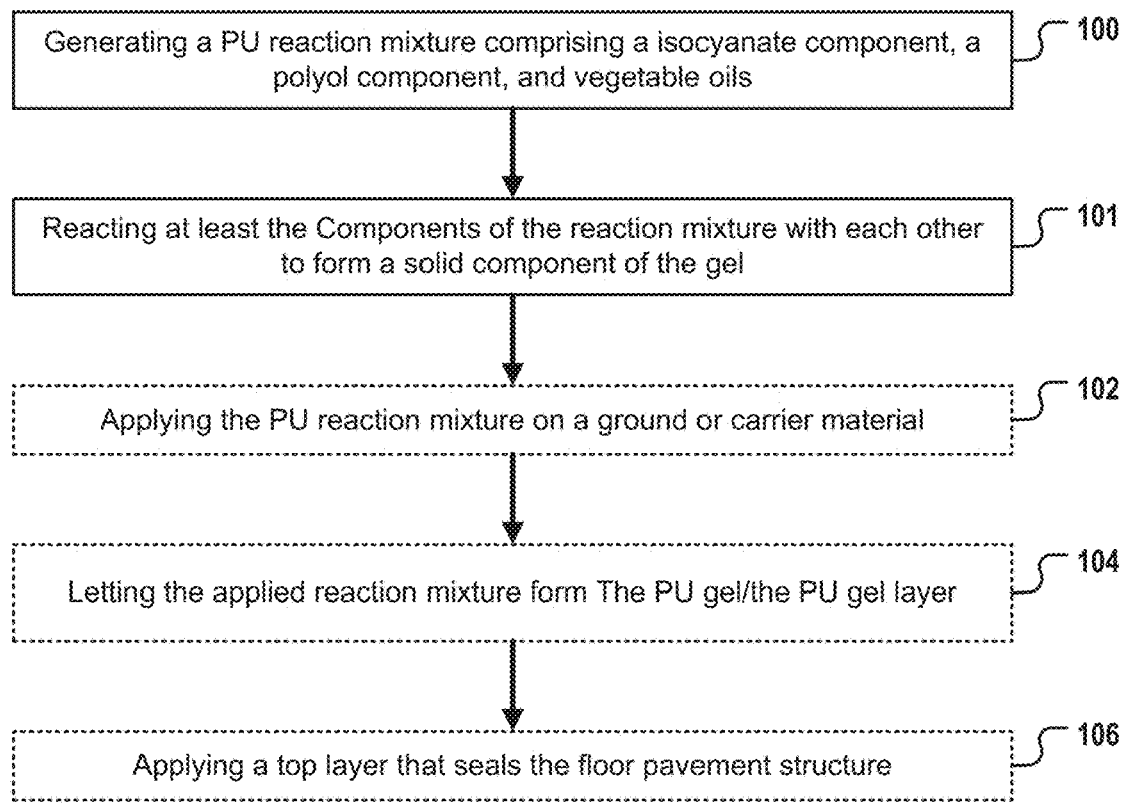
FIG. 1 is a flow chart of a method for constructing a PU gel according to an embodiment of the invention.
Figure 2:
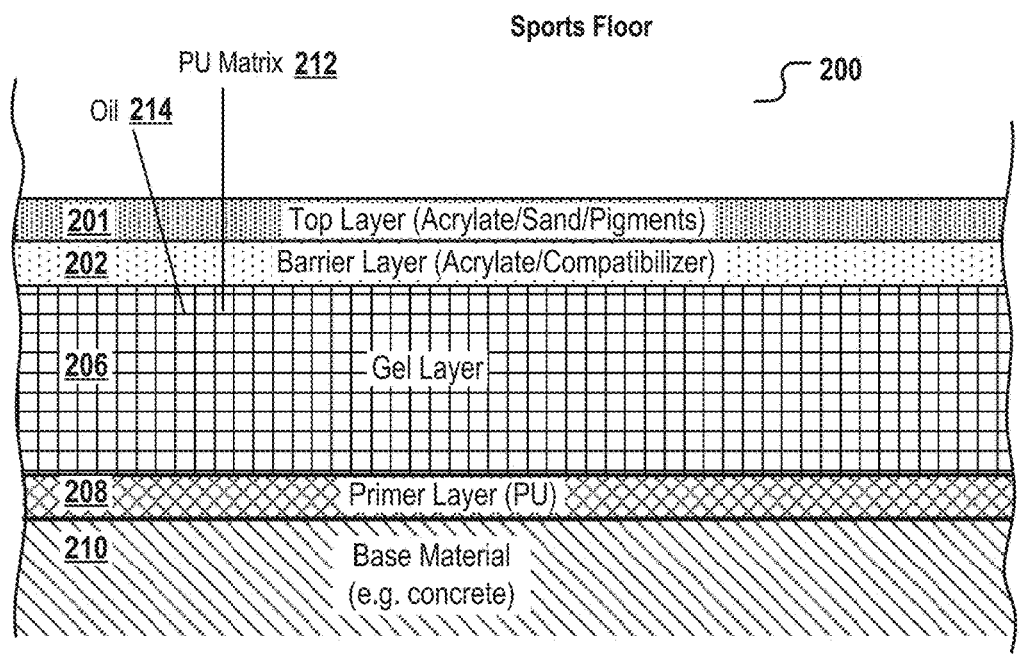
FIG. 2 depicts a multi-layer pavement structure according to an embodiment of the invention.

In case the gel is a gel layer of a pavement structure 200 as depicted, for example, in FIG. 2, the method may further comprise a step 102 in which a person or a machine applies a PU reaction mixture on top of a base material 210, e.g. a concrete floor. The PU reaction mixture is applied directly on the base material or is applied on a primer layer 208 that was applied on the base material before and has already hardened. The applied reaction mixture is allowed to form in step 104 a PU gel 206 in the form of a PU gel layer. The PU gel layer comprises a solid component and a liquid component. The solid component 212 is a matrix of cells made of polyurethane polymers. The liquid component is the plasticizer. For example, a composition of vegetable oils is used as the plasticizer, whereby the composition of the oils is chosen such that the oils remain liquid over a broad temperature range.

Preferentially, the typical temperature range of the geographic region where the pavement structure is constructed is taken into account. For example, the composition of the vegetable oils is chosen such that the fraction of unsaturated oils negatively correlates with the temperature: the lower the temperature, the higher the fraction of unsaturated vegetable oils for ensuring that the oils remain liquid. After the formation of the PU gel layer has completed, a top layer 201 is applied in step 106 on top of the PU gel layer 206. The top layer seals the floor pavement structure on top of the PU gel layer, thereby preventing rain from penetrating the structure 200. Thus, according to embodiments, the top layer is a sealing layer that makes the floor structure water- and other liquid-impenetrable and resistant. Thus, the top layer may protect the floor structure against rain. Optionally, before the primer has dried, silica sand or other forms of granules having the size of silica sand is applied on the primer layer for increasing the surface roughness of the primer layer. After the primer layer has dried, the PU reaction mixture is applied on top of the primer layer as described above for embodiments of the invention.

Preferentially, a barrier layer 202 is applied on top of the gel layer when the applied reaction mixture has finished forming the PU gel layer. The application of the top layer comprises: after the barrier layer has solidified, applying the top layer 201 on top of the barrier layer.

According to some embodiments, the substances used for generating the pavement structure are provided in the form of a sports surfacing system that can be customized to different temperature ranges, different appearance and different use case scenarios.

For example, the top layer is a 100% acrylic emulsion consisting of pigments and PU polymers that are blended into a highly concentrated form that is highly wear resistant.

A more concrete example of a possible composition of the barrier layer and the top layer is given below.

| Barrier layer composition (liquid state) | |
| --- | --- |
| Acrylic latex solution (dry matter: 60%) | 66% |
| Water | 22% |
| Ethylene glycol (compatibilizer) | 1% |
| Further additives (fungicides, etc.) | 11% |

When the barrier layer has dried and the water (including the water of the acrylic latex solution and of the additives, if any) has evaporated, the barrier layer comprises acrylic latex in an amount of more than 70% by its weight. It strongly adheres to the polyurethane matrix of the gel layer.

| Top layer composition (liquid state) | |
| --- | --- |
| Acrylic latex solution (dry matter: 60%) | 22% |
| Water | 21% |
| Chalk | 34% |
| Thickener (Xanthan Gum) | 19% |
| Further additives (fungicides, etc.) | 4% |

When the top layer has dried and the water has evaporated, the major weight component of the top layer may consist of the filler material (chalk). In particular, in case the top layer comprises sand in addition to chalk, the top layer may comprise sand and chalk in an amount of more than 60% by its weight. Thus, the fraction of acrylic latex in the top layer is comparatively small. Nevertheless, as the top layer is preferentially applied not directly on the gel layer but rather on the barrier layer with the compatibilizer, it is ensured that the top layer does not delaminate.

The primer layer can comprise, for example, about 65% of a PU prepolymer, about 25% of solvent naphtha (Mixtures of light aromatic hydrocarbons obtained from coal tar or petroleum) and about 10% of Propylene glycol methyl ether acetate (PGMEA, 1-methoxy-2-propanol acetate) (an adhesive).

For instance, the primer is applied to asphalt, clay or properly prepared concrete.

The generated pavement structured is a resilient, multi-layered application designed to give added comfort and cushioning for an enjoyable playing experience.

According to some embodiments (not shown), the pavement structures comprises EPDM (ethylen-propylen-dien) rubber particles application designed to increase shock-absorbing properties of the structure for. Preferentially, the EPDM rubber particles are embedded in a top layer that consists of non-foamed polyurethane that is directly applied onto the gel layer.

Before the surfacing system is applied the base material, e.g. concrete or asphalt, needs to be prepared properly, e.g. must be cleaned from dust and moisture. Asphalt and concrete substrates shall be allowed to cure a minimum of 30 days before application of any coatings. The primer can be applied to 5-day old concrete substrates. The base material shall be clean and dry before the different layers are applied. The surface of the substrate shall be inspected and made sure to be free of grease, oil, dust, dirt and other foreign matter before any coatings are applied. Preferentially, the surface and air temperatures should be at least 50° F. (10° C.) and rising for applying the individual layers. Once the surface has been thoroughly cleaned and is free of all loose material, dirt, or dust, the court shall be flooded and allowed to drain a minimum of 30 minutes and a maximum of 1 hour. Any area that holds water in depth greater than 1/15 inch shall be outlined and patched with the primer.

According to embodiments, the primer is mixed by pouring the "B" component into the "A" component (B and A components refer to the isocyanate and polyol components of a PU reaction mixture) and mixing using a low speed jiffy mixer (400 to 600 rpm) for 2 minutes. The mixed primer is applied on the base material using a medium nap roller to achieve a total coverage of approximately 0.0 30 gal/yd 2 (0.15 kg/m 2-300 ft 2/gal). Optionally, 40 to 60 mesh silica sand is applied onto the wet primer at the rate of 5 pounds per 100 sq. ft. (0.24 kg/m 2) to create e a rough texture. Allow 5 to 6 hours drying time before proceeding with applying additional layers on top of the primer layer.

According to some embodiments, the polyurethane reaction mixture comprising the liquid plasticizer is applied to a ground in one or more lanes using a vehicle. The polyurethane reaction mixture can be applied directly on the ground or can be applied on top of a primer layer that has been applied previously to seal the ground.

In case multiple lanes of the gel layer are applied, the lanes are arranged adjacent to each other and a side edge of a first lane is in contact with a side edge of an adjacent second lane of the reaction mixture that generates a PU polymer matrix soaked with the plasticizer as the PU gel layer.

According to embodiments, the PU reaction mixture that is applied on top of the base materials (or the primer layer) is generated in a method comprising providing polyurethane reactive components and the plasticizer. The reactive components comprise a isocyanate component and a polyol component.

mixing the polyurethane reactive components; the reactive components and/or the composition of the plasticizer can chosen in dependence on environmental parameters, e.g. the typical temperature range at the installation site;

mixing the isocyanate component and the polyol component and the liquid plasticizer; for example, a mixing unit of the vehicle can be used for the mixing step, applying one or more lanes of the reaction mixture comprising the plasticizer to a ground using an application unit connected to the mixing unit.

Alternatively, the mixing and application can be performed manually.

In case multiple lanes are applied, a side edge of the second lane gets in contact with a side edge of the first lane. The process parameters for mixing the polyurethane reactive components are determined so that the PU gel layer and its PU polymer matrix of the first lane is not cured before applying the foam of the second lane.

The curing time of the polyurethane (PU) matrix may depend on various conditions: in particular the environmental conditions. For example, high temperatures, direct sunlight or low relative humidity may accelerate the curing process.

The plasticizer is preferentially incorporated into the cells of the forming PU polymer matrix by whisking the liquid plasticizer into the polyurethane reaction mixture or into one of the components of the reaction mixture, e.g. the polyol component. In an embodiment the cellular polyurethane polymer matrix is generated by the oscillation of a tube or pipe reactor fed with the PU mass and the liquid plasticizer and compression and expansion effects are achieved by the oscillation of the tube. The tube is constructed such that air is prohibited from filling the PU matrix cells.

In an embodiment the used PU formulation comprises an MDI based NCO terminal prepolymer, produced from an isomeric mixture of 2,4'; 4,4' and 2,2' MDI monomer based prepolymer with an NCO content of 1.5-18 weight % with 2.2 MDI between 1 and 40%. The preferred polyol being either standard or endcapped, activated polyether polyols like polypropylene glycol of the average molecular weight ranging from 100 up to 6000. In a very preferred embodiment, a high molecular weight primary hydroxyl terminated diol of the molecular weight 2000-4000 with hydroxylnumbers of 25-60 mg KOH/g is used to produce the NCO terminal prepolymer. As hydroxyl-terminal component a branched castor oil based polyol can be used, which typically is generated by a thermal and enzymatic transesterification process reacting with a ketone resin. Reactivity may be adjusted by using typically suitable metal-organic catalyst like e.g. dibutyltin or dilaurate.

In another embodiment the NCO terminal prepolymer and the OH terminal polyol are chilled at 10-25° C. and pumped in a prefixed ratio through a static mixer, transported to a mixing unit.

To avoid undesired excessive foaming a water-adsorbing additive like a zeolite or any other molecular sieve or desiccant can be used. In an embodiment the desiccant can have a pore size of 3-5 angstrom and is used in the range of 0.1-3 weight % of the polyol weight, in a very preferred embodiment between 0.5-2% of the polyol weight.

In order to improve the controlling of the curing time, additional polyurethane forming ingredients may be added to the reaction mixture. The type and the quantity of the polyurethane forming ingredients depends e.g. on measured environmental data or on the type of plasticizer used. The additional polyurethane forming ingredients may include one or more of the following: additives, frothing agents or other known additives for polyurethane floorings.

Preferentially, the components of the PU reaction mixture are chosen such that the generated PU polymer matrix cells more or less completely encapsulate the liquid plasticizer contained in the cells. Thereby, the totality of PU polymer cells largely prevent the plasticizers to escape to other cells or into an inter-cellular space when mechanical pressure is applied on the gel layer.

The produced PU polymer matrix may be stabilized by a silicone high sheer foam stabilizer enhancing cell stabilization at polymer matrix densities (without the plasticizer) of 200-400 kg/m$^3$, preferably 100-600 kg/m$^3$. In an embodiment the silicone stabilizer is used at 0.1%-4 weight %, preferably between 1% and 2%. Furthermore, diverse pigments and fillers can be used like calcium carbonate, bentonite to stabilize the foam further and strengthen its structure.

In an embodiment, the gel layer may render high elastomeric resilience and good damping properties (achieving a shock absorbance of e.g. >40% at temperatures of 15° C.).

According to embodiments, the position and/or the speed of a vehicle for applying the foam to the ground may be measured and the process parameters and the type and the quantity of PU gel layer forming ingredients are adjusted depending on the position and the speed of the vehicle.

Figure 3:
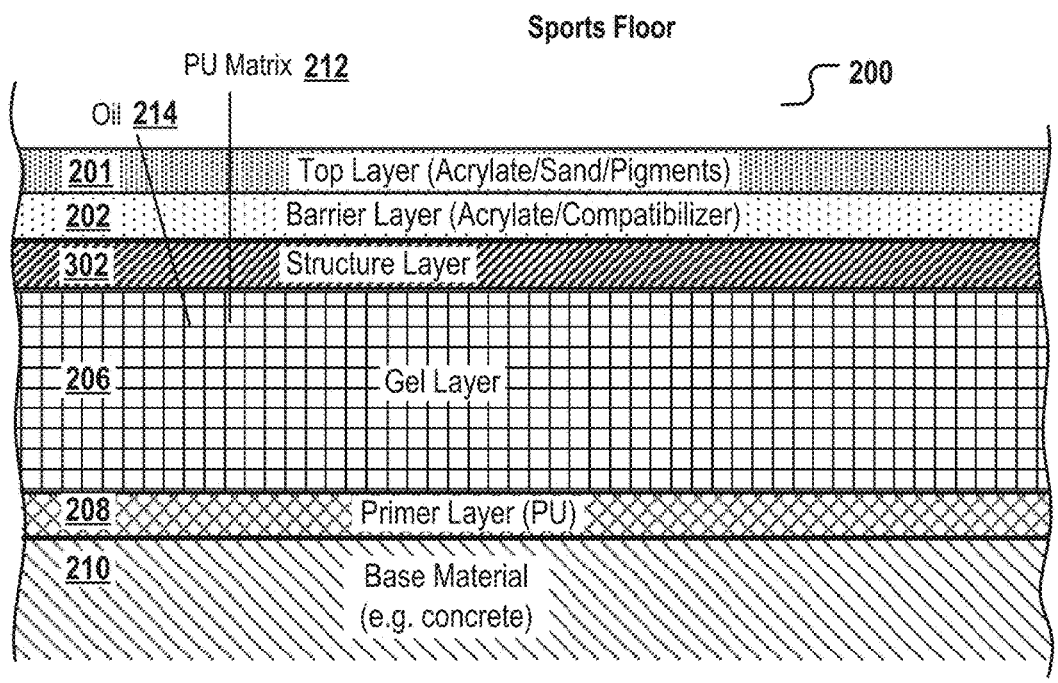
FIG. 3 depicts a multi-layer pavement structure according to a further embodiment.

FIG. 3 depicts a pavement structure according to a further embodiment. The pavement layer comprises the layers described already for embodiments of the invention, in particular the embodiments depicted in FIG. 2. In addition, the pavement structure comprises a further layer 302 referred herein as "structure layer". The structure layer preferentially has a thickness of 100 μm-2500 μm, 400 μm-1500 μm, 800 μm to 1200 μm, e.g. 1000 μm. The structure layer is located between the gel layer and the top layer or between the gel layer and the barrier layer, if any. The structure layer is a further polyurethane layer. Preferably, the polyurethane in the PU layer is a none-foamed or moderately foamed PU layer. For example, the PU of the structure layer can have a density of about 1.0 to 1.1 g/cm³. The structure layer may improve the structural stability of the pavement structure by ensuring that any mechanical pressure is distributed evenly on the gel layer. Thus, the structure layer may prevent the gel layer from being damaged by a high mechanical pressure applied to a single small spot.

Figure 4:
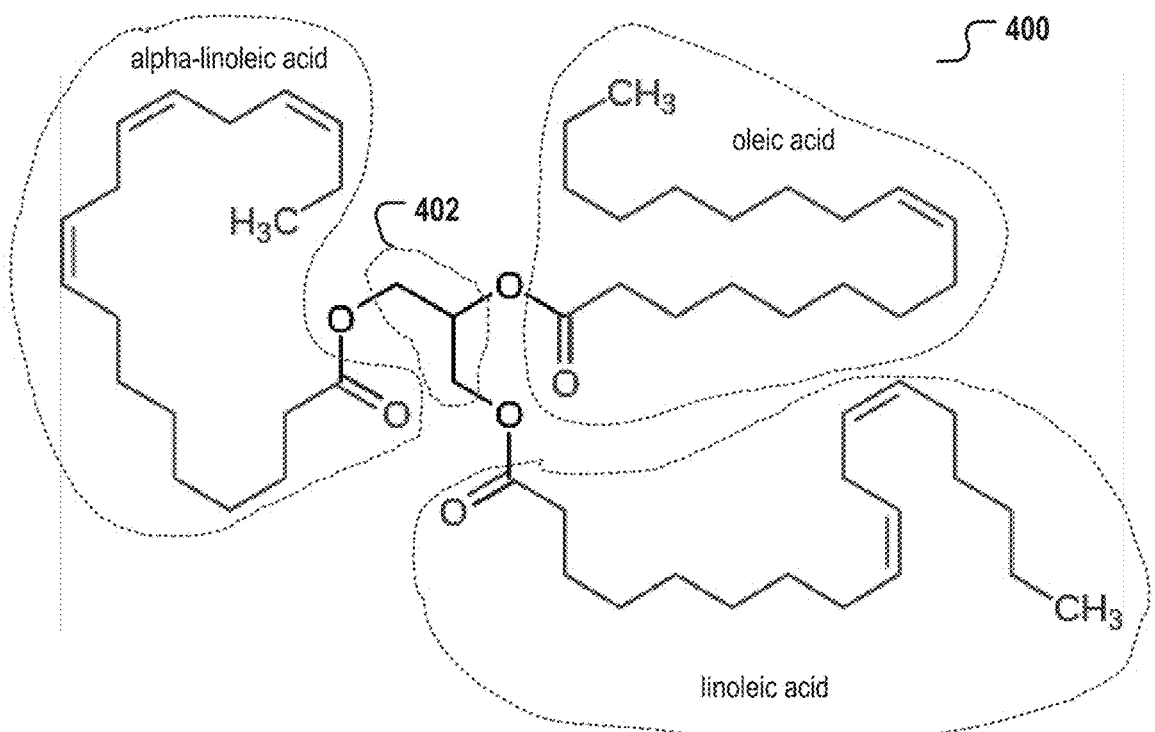
FIG. 4 depicts a triglyceride molecule.

FIG. 4 depicts a (mixed) triglyceride molecule 400 comprising three different fatty acid chains: monounsaturated oleic acid, di-unsaturated linoleic acid and tri-unsaturated alpha-linoleic acid. A triglyceride (TG, triacylglycerol, TAG, or triacylglyceride) is an ester derived from glycerol and three fatty acids. Triglycerides are the main constituents of body fat in humans and other animals, as well as vegetable fat. They are also present in the blood to enable the bidirectional transference of adipose fat and blood glucose from the liver, and are a major component of human skin oils. The depicted triglyceride comprises a carbon atom backbone 402 consisting of three carbon atoms. Preferably, the backbone 402 comprises four, five or more than 10 carbon atoms. A longer carbon atom backbone may have the advantage tha a larger number of fatty acids can be bound to the backbone. Preferably, at least four fatty acid chains are covalently linked to the backbone. Thus, a high-molecular but nevertheless highly flexible macro molecule is provided that can be covalently linked to the PU matrix of only one of its fatty acid chains comprises a functional group, e.g. an —OH or —NH2 group that reacts with the isocyanate component in the PU reaction mixture.

Using vegetable oils may have the advantage that many vegetable oils contain a complex mixture of individual triglycerides. Because of this, they melt over a broad range of temperatures. For example, linseed oil can be used as plasticizer. It comprises triply unsaturated α-linolenic acid (51.9-55.2%), saturated acids palmitic acid (about 7%) and stearic acid (3.4-4.6%), monounsaturated oleic acid (18.5-22.6%), and doubly unsaturated linoleic acid (14.2-17%).

Figure 5:
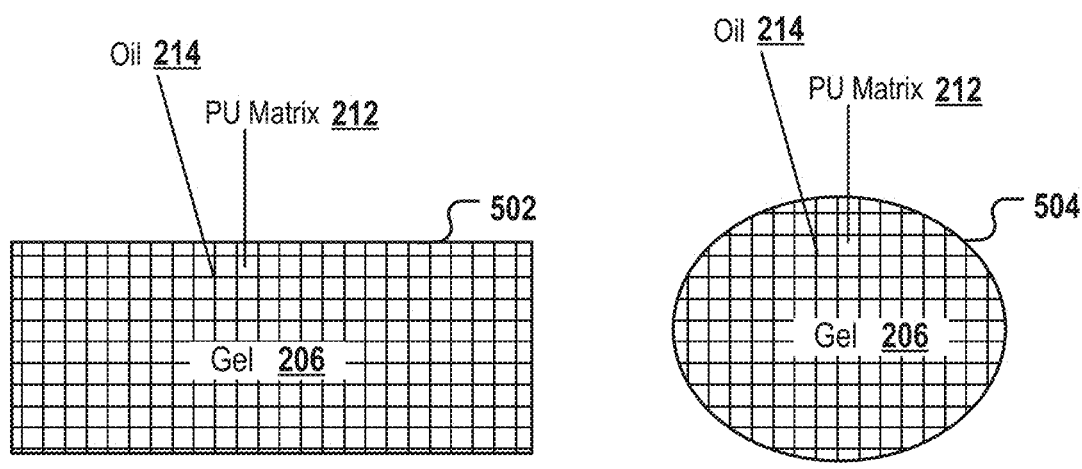
FIG. 5 depicts two further embodiments of the gel.

FIG. 5 depicts two further embodiments of the PU gel 206. The gel may have different shapes 502, 504 depending on the object in which it is to be integrated. For example, the gel may be integrated into a shoe sole, a vehicle panel, a pavement structure, or the like.

LIST OF REFERENCE NUMERALS

100-106 steps
200 pavement structure
201 top layer
202 barrier layer
206 gel (e.g. gel layer)
208 primer layer
210 base material
212 solid PU polymer matrix
214 liquid vegetable oil
302 structure layer
400 triglyceride molecule
502 PU gel having a first shape
504 PU gel having a second shape

The invention claimed is:

1. An elastic gel, comprising:
a solid component, the solid component being polyurethane polymer matrix; and
a liquid component, the liquid component being a plasticizer, the plasticizer being a chemical derivative of one or more vegetable oils, the plasticizer being a polyester generated in a transesterification from the one or more vegetable oils comprising triglycerides, molecules of the polyester respectively comprising at least four fatty acids, wherein a glycerol of the triglycerides is replaced by an alcohol comprising more than three carbon atoms or by a polyoxymethylene (POM) resin, wherein the molecules of the polyester respectively comprise a carbon atom backbone and the at least four fatty acids are covalently linked to the carbon atom backbone, the liquid component being comprised in cells of the polyurethane polymer matrix.

2. The gel of claim 1, wherein the at least four fatty acids are respectively bound to the carbon atom backbone by an ester bond, the carbon atom backbone comprising at least four carbon atoms.

3. The gel of claim 1, whereby at least 90% of the liquid component consists of the one or more vegetable oils or the chemical derivative of the one or more vegetable oils or a mixture thereof.

4. The gel of claim 1, wherein at least 1% by weight of the plasticizer is covalently bound to the polyurethane polymer matrix.

5. The gel of claim 4, wherein the plasticizer that is covalently bound to the polyurethane polymer matrix is a vegetable oil that comprises one or more functional groups in at least one fatty acid chain of the vegetable oil, the one or more functional groups having reacted with an isocyanate in a polyurethane reaction mixture, the polyurethane reaction mixture being used to form the polyurethane polymer matrix, covalent bonds connecting the at least one fatty acid chain with the polyurethane polymer matrix.

6. The gel of claim 1, having a height of 1 mm to 800 mm.

7. The gel of claim 1, wherein more than 50% by weight of the one or more vegetable oils consists of unsaturated triglycerides.

8. The gel of claim 1, the one or more vegetable oils comprising soy bean oil.

9. The gel of claim 1, the one or more vegetable oils comprising castor oil.

10. The gel of claim 1, wherein at least 95% by weight of the plasticizer is covalently bound to the polyurethane polymer matrix.

11. The gel of claim 1, wherein the polyester is generated in an enzymatic transesterification from the one or more vegetable oils comprising triglycerides.

* * * * *